Jan. 24, 1967 T. R. STOCKTON 3,299,740
TRANSMISSION
Filed Dec. 30, 1963
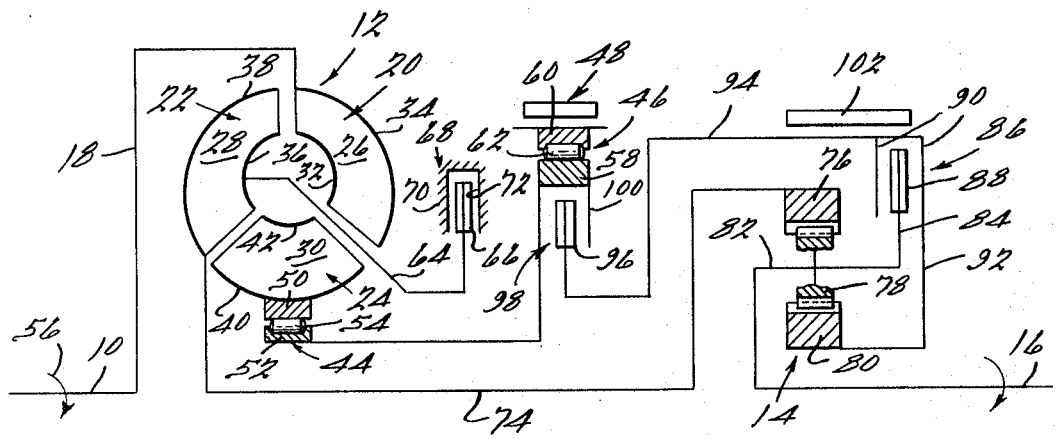
Thomas R. Stockton.
INVENTOR.
BY John R. Faulkner
Robert E. McCollum
ATTORNEYS.

United States Patent Office 3,299,740
Patented Jan. 24, 1967

3,299,740
TRANSMISSION
Thomas R. Stockton, Northville, Mich., assignor to Ford Motor Company, Dearborn, Mich., a corporation of Delaware
Filed Dec. 30, 1963, Ser. No. 334,286
3 Claims. (Cl. 74—677)

This invention relates to an automatic transmission construction, and more particularly, to one of the hydraulic torque converter-planetary gearset type.

One of the objects of the invention is to provide a transmission that is economical to manufacture, simple in construction, and efficient in operation.

Another object of the invention is to provide an automatic transmission construction, wherein a hydraulic torque converter is combined with a single, simple planetary gearset in a manner providing efficient operation with a variety of different drive ratios.

A further object of the invention is to provide a transmission combining a high performance hydraulic torque converter with a simple three-element planetary gearset; wherein, the normal start up drive is provided by the torque converter alone, the gearset being conditioned for a direct drive; a performance range being established by conditioning the gearset initially for a reduction drive with an automatic pickup shift to a direct drive; a higher performance range being established by the torque converter alone operating in a torque multiplying phase.

A still further object of the invention is to provide a transmission construction having a hydraulic torque converter combined with a simple planetary gearset in such a manner that the transmission shifts from a performance reduction drive range to a direct drive range automatically by a nonsynchronous pickup shift, thus simplifying the control system.

Another object of the invention is to provide a simplified transmission construction having two drive ranges of operation; one being provided by the operation of a hydraulic torque converter per se, the second combining the operation of the converter with a two-speed planetary gearset automatically shifted between speed ratios.

Other objects, features, and advantages of the invention will become apparent upon reference to the succeeding detailed description thereof, and to the drawing illustrating the preferred embodiment thereof; wherein, the figure shows, schematically, the upper half of a cross section of one form of transmission embodying the invention.

A transmission is shown having, in interconnected relationship, a power input shaft 10, a hydraulic torque converter 12, a planetary gearset 14, and a power output shaft 16. The input shaft 10 is driven by any suitable source of power, such as, for example, the internal combustion engine for a motor vehicle. The shaft is drive connected by a shell or housing 18 to the impeller 20 of converter 12. This converter is of the high performance type of an appropriate size and with blades suitably shaped to accomplish this purpose. It is constantly filled with operating fluid from a source, not shown, and includes a turbine 22 and a stator or reaction member 24. Each of the impeller, turbine, and stator members includes circumferentially spaced blades 26, 28, and 30 secured between inner and outer annular shrouds 32, 34 and 36, 38 and 40, 42, respectively.

The converter operates in a known manner, the inner and outer shrouds together defining a toroidal path for the circulation of fluid between the pump and turbine. At stall, or low turbine speeds, the fluid is discharged from the turbine blades at such an angle as to strike the backs of the stator blades and attempt to rotate them in a direction opposite to that of the turbine. This is prevented, however, by an assembly consisting of a one-way clutch 44, a one-way coupling 46, and a selectively operable friction brake 48. The stator inner shroud 40 is secured to the outer race 50 of clutch 44. This clutch is of a known overrunning type having an inner annular race 52 separated from race 50 by spaced sprags or rollers 54. The sprags move to inoperative positions upon rotation of stator 24 in a clockwise or forward direction (arrow 56) relative to race 52; and, move to wedge the two races 50 and 52 together upon counterclockwise rotation of the stator to prevent relative rotation between the races in this direction.

The inner race 52 is connected to the inner race 58 of the one-way overrunning unit 46. This unit acts as a brake for forward speed operation, and as a clutch for a reverse drive. It is constructed in a manner similar to clutch 44. It has an outer annular race 60 spaced from the race 58 by sprags or rollers 62. The outer race is adapted to cooperate with the brake 48. This latter brake is of the fluid pressure actuated, spring released type, and is selectively operable to hold outer race 60 stationary for forward drive, or to release the outer race for reverse rotation to provide a reverse drive, as will be explained later. The unit 46 thus prevents reverse rotation of inner race 58 and stator 24 when brake 48 is engaged. At low turbine speeds, therefore, the stationary stator provides a torque multiplying phase of operation of the converter.

At higher turbine speeds, the fluid is discharged from turbine blades 28 at a more favorable angle, and strikes the front portions of stator blades 30, rotating them in a clockwise direction. The clutch 44, which has been acting as a brake, then disengages, permitting this rotation. The torque multiplying phase of operation of the converter now terminates, and it operates essentially as a fluid coupling, merely transmitting the input shaft torque to the turbine shaft without multiplication.

The turbine can be held stationary to establish a reverse drive. It is connected by a member 64 to a friction disc 66 constituting one part of a reverse brake 68. The brake is of a fluid pressure actuated, spring released type having a stationary outer portion 70 with internal friction surfaces 72 adapted to cooperate with the disc 66 to prevent its rotation.

Turbine 22 is drivingly connected by a shaft 74 to the ring gear 76 of the planetary gearset 14. This gearset is of the simple three-element type having a number (only one shown) of planet pinion gears 78 meshing with the ring gear and a sun gear 80. The pinion gears are rotatably mounted upon a carrier 82 formed as an extension of the power output shaft 16. Carrier 82 is also formed with an extension 84 constituting the internal portion of a clutch 86.

Clutch 86, like brakes 48 and 68, is of the fluid pressure actuated, spring released type. It has a friction disc 88 secured to extension 84, the disc extending between a number of friction discs 90. The discs 90 are fixed by a flange 92 to the sun gear 80. Discs 90 are also fixed by a drum-like member 94 to a friction disc 96 forming one part of a Low and Reverse engaging mechanism 98. This latter mechanism is of the fluid pressure applied, spring released type, and has a number of friction discs 100 cooperating with discs 96. Discs 100 are fixedly secured to the inner race member 58.

The surface of drum-like member 94 is adapted to cooperate with a fluid pressure actuated band 102, which is selectively applied during a low speed or performance range of operation to provide hill braking, in a manner to be described.

The control system for controlling the engagements or disengagements of the various clutches and brakes, by fluid under pressure, is not shown, since it is believed to be unnecessary for an understanding of the invention. Suffice it to say, however, that fluid under pressure will be supplied to the various disc clutches and/or friction brakes to engage them or disengage them in timed relationship to each other, and in accordance with a predetermined schedule based on vehicle speed, engine torque demand, and other parameters, in a manner to be described.

In operation, Neutral is established by disengaging clutches 98 and 86, and brake 68, and bands 48 and 102. Accordingly, the drive transmitted from turbine 22 to the gearset is prevented from being transmitted to output shaft 16 due to the free rotation of sun gear 80.

Normal Forward speed operation is obtained by means of the torque converter per se. That is, clutch 86 is engaged to lock sun gear 80 and carrier 82 together to condition the gearset 14 for a direct drive. Clutch 96, and brakes 68 and 102, are released, and brake 48 is applied. Accordingly, clockwise rotation of input shaft 10, in the direction of arrow 56, drives turbine 22 in the same direction, which causes stator 24 to attempt to rotate in an opposite direction. This causes clutch 44 and one-way brake 46 to engage, preventing such rotation. The torque convertor 12 is thus conditioned for a torque multiplying phase of operation, multiplying the torque of the input shaft. Turbine 22 thus drives output shaft 16 at turbine speed, and in the same direction, through shaft 74 and the locked up gearset 14. At higher turbine speeds, the fluid strikes the front portions of the stator blades, rotating them forwardly off the one-way clutch 44. The convertor now acts as a fluid coupling. Accordingly, the turbine now drives output shaft 16 substantially at the speed of input shaft 10.

With the high performance converter described, this normal start up drive with the gearset in direct drive, is ample for most operating conditions, since ample multiplication of the input torque is provided by the converter. During operation at high speeds, acceleration is provided by the increase in speed of the input shaft 10 again causing the stator to act as a reaction member to multiply the torque to the output shaft 16 until the coupling stage of the converter is again reached.

A performance range of operation is provided by initially disengaging clutch 86 and engaging clutch 98 and brake 48, locking sun gear 80 and stator 24 to one-way brake 46. From a vehicle standstill condition, clockwise rotation of input shaft 10 causes converter 12 initially to operate as previously described, the stator being held against reverse rotation by clutch 44 and brake 46. Additionally, the gearset 14 is conditioned for a reduction drive by the sun gear 80 also being prevented from rotating in a counterclockwise direction. That is, the clockwise rotation of ring gear 76 by turbine 22 causes a similar rotation of pinion gears 78 to attempt to rotate sun gear 80 in a counterclockwise direction, which is prevented by the clutch 96 and brake 46. Pinion gears 78, therefore, walk around the stationary sun gear 80, driving carrier 82 and output shaft 16 in a clockwise direction, and at a speed reduced from that of the turbine shaft 74. The output shaft is now driven at a compound reduction through both the converter 12 and the gearset 14.

During this stage of operation, sun gear 80 is only prevented from rotating in a reverse direction, and is free to rotate forwardly. If a coast condition of the vehicle occurs, that is, when output shaft 16 becomes the driver, carrier 82 will tend to rotate the sun gear 80 forwardly or clockwise. Therefore, at this time, brake 102 may be applied to stop the sun gear from rotating in any direction, and condition the gearset for a positive reduction drive at all times. Accordingly, an engine braking effect will be provided by the ring gear 76 and turbine 22 attempting to rotate the pump 20 forwardly faster than it is being driven by the input shaft 10.

When converter 12 reaches its coupling stage of operation, the stator 24 freewheels in a clockwise direction off the clutch 44. At this point, clutch 86 is engaged in timed relationship to the freewheel of the stator, to lock up the gearset 14 for a direct drive. It is not necessary to release clutch 98 at this moment, since sun gear 80 can rotate forwardly off the one-way brake 46. Maintaining clutch 98 engaged at this particular moment provides an advantageous nonsynchronous pickup shift upon engagement of clutch 86. If clutch 98 were disengaged prior to the engagement of clutch 86, the gearset could freewheel and the driveline to the output shaft would be broken. Accordingly, the clutch 98 is disengaged subsequent to the engagement of clutch 86, and late in the upshift cycle, at a low load point.

If desired, the clutch 98 need not be disengaged at all after the engagement of clutch 86. Under these conditions of operation, the locked up condition of the gearset 14 would then cause the clutch 44 to engage and drive the stator 24 forwardly at the same speed as turbine 22 and therefore provide substantially a locked up condition of the fluid coupling. The selective operation of clutch 98 therefore provides a fluid-direct drive through the transmission that closely approaches that of a mechanical direct drive.

A Reverse drive is established by engaging reverse brake 68 to hold turbine 22 and ring gear 76 stationary, engaging clutch 98, and releasing bands 48 and 102 and clutch 86. The gearset 14 is now conditioned for a reduction drive, with ring gear 76 acting as a reaction member. Accordingly, clockwise rotation of shaft 10 and pump 20 causes the stator 24 to be rotated in a reverse direction. This engages clutch 44 and one-way brake 46, which now acts as a clutch, since brake 48 is disengaged, and the stator can rotate in a reverse direction. With clutch 98 engaged, sun gear 80 is driven at the speed of stator 24, and in a reverse direction, causing clockwise rotation of pinion gears 78. The pinion gears walk around within the stationary ring gear 76 in a counterclockwise direction to drive carrier 82 and output shaft 16 in the same direction and at a speed reduced from that of input shaft 10.

From the foregoing, it will be seen that the invention provides a simplified automatic transmission, in that it contains only two driving units; a hydraulic torque converter, and a simple planetary gearset. And yet, it provides a normal driving range, and a performance range, to establish a number of drives between the power input and output shafts. It will also be seen that, during the performance range, an automatic pickup shift is provided during the establishment of a direct drive through the transmission.

While the invention has been illustrated in its preferred form, it will be clear to those skilled in the arts to which this invention pertains that many changes and modifications may be made thereto without departing from the scope of the invention.

I claim:

1. A transmission having power input and output shafts, and means connecting said shafts providing a plurality of drives therebetween, said means including a hydraulic torque converter and a planetary gearset, said converter having a pump connected to said input shaft, and a turbine and a stator, said gearset having drive, driven and reaction members, means connecting said turbine to said drive member, means connecting said driven member to said output shaft, a plurality of overrunning brake means arranged in series holding stator against rotation in one direction of rotation to establish a torque multiplying phase of operation of said converter, selectively operable clutch means when operable locking up said gearset for a direct drive therethrough, and selectively engageable fluid pressure actuated coupling means when engaged connecting said reaction member to said stator through said brake means to prevent relative rotation therebetween in one direction, the normal start up drive of said output shaft being provided by the engagement of said clutch means to operate said converter in a torque multiplying phase with said gearset in a locked up condition, performance range of operation being provided by the disengagement of said clutch means and engagement of said engagable means to condition said gearset for a reduction drive therethrough in one direction, a subsequent drive range being provided by the subsequent re-engagement of said clutch means to condition said transmission substantially for a direct drive therethrough.

2. A transmission having power input and output shafts, and means connecting said shafts providing a plurality of drives therebetween, said means including a hydraulic torque converter and a planetary gearset, said converter having a pump connected to said input shaft, and a turbine and a stator, said gearset including sun and ring gears and a planet carrier, means connecting said turbine to said ring gear, and said carrier to said output shaft, first and second overrunning means in series arrangement operable to hold said stator against rotation in one direction of rotation to establish a torque multiplying phase of operation of said converter, first clutch means for locking up said gearset for a direct drive therethrough, selectively engageable clutch means when engaged connecting said sun gear to said second overrunning means and to said stator to prevent relative rotation therebetween in one direction, the normal start up drive of said output shaft being provided by the engagement of said first and second overrunning means and said first clutch means to operate said converter in a torque multiplying phase with said gearset in a locked up condition, a performance range of operation being provided by the disengagement of said clutch means and engagement of said selectively engageable means and said first and second overrunning means to condition said gearset for a reduction drive therethrough, a subsequent faster drive of said output shaft being provided by re-engagement of said first clutch means and the subsequent disengagement of said selectively engageable means.

3. A transmission as in claim 2, said selectively engageable means connecting said sun gear parallel to said second overrunning means and to said first overrunning means.

References Cited by the Examiner
UNITED STATES PATENTS

| | | | |
|---|---|---|---|
| 2,368,801 | 2/1945 | Carnagua et al. | 74—763 |
| 2,578,450 | 12/1951 | Pollard | 74—677 |
| 2,612,791 | 10/1952 | Miller et al. | 74—677 |
| 2,695,533 | 11/1954 | Pollard | 74—677 |
| 3,113,470 | 12/1963 | Knowles | 74—677 |
| 3,141,355 | 7/1964 | Gabriel | 74—677 |

DAVID J. WILLIAMOWSKY, *Primary Examiner.*

THOMAS C. PERRY, *Examiner.*